US008122925B2

(12) United States Patent
Lane et al.

(10) Patent No.: US 8,122,925 B2

(45) Date of Patent: Feb. 28, 2012

(54) PROTECTIVE COVER DEVICE FOR ATTACHMENT OVER FOOT REST BRACKETS ON A WHEELCHAIR

(76) Inventors: Pamela A. Lane, Cooper City, FL (US); Donald Pease, Cooper City, FL (US)

(*) Notice: Subject to any disclaimer, the term of this patent is extended or adjusted under 35 U.S.C. 154(b) by 396 days.

(21) Appl. No.: 12/321,168

(22) Filed: Jan. 15, 2009

(65) Prior Publication Data

US 2009/0194976 A1 Aug. 6, 2009

Related U.S. Application Data

(60) Provisional application No. 61/011,108, filed on Jan. 16, 2008.

(51) Int. Cl.
*B60N 2/44* (2006.01)

(52) U.S. Cl. ......................... 150/154; 280/727; 224/407

(58) Field of Classification Search .................. 150/154; 280/727; 224/407

See application file for complete search history.

(56) References Cited

U.S. PATENT DOCUMENTS

| | | | | |
|---|---|---|---|---|
| 2,368,930 | A * | 2/1945 | Lenz | 5/652 |
| 3,488,684 | A * | 1/1970 | Wrightson | 112/420 |
| 4,805,937 | A * | 2/1989 | Boucher et al. | 280/33.992 |
| 5,129,695 | A * | 7/1992 | Norman, II | 293/128 |
| 5,722,672 | A * | 3/1998 | Frederick | 280/33.992 |
| 5,960,492 | A * | 10/1999 | Byrne | 5/413 R |
| 6,604,789 | B1 * | 8/2003 | Downing | 297/227 |
| 2003/0178274 | A1 * | 9/2003 | Chi | 190/125 |
| 2005/0242558 | A1 * | 11/2005 | Cohen | 280/770 |
| 2006/0097020 | A1 * | 5/2006 | Johnson | 224/407 |

* cited by examiner

*Primary Examiner* — Tri Mai

(74) *Attorney, Agent, or Firm* — Robert M. Downey, P.A.

(57) ABSTRACT

An injury protection device for attachment over foot rest brackets on the front legs of a wheelchair includes a generally rectangular main body having an outer case constructed of a durable soft fabric material and defining a top side and a bottom side. An interior pocket formed between the top side and bottom side of the outer case is filled with a central core of premium densified batting sandwiched between upper and lower layers of polyester batting. An arrangement of tacking stitches made from the top side to the bottom side of the outer case increase flexibility of the main body and provide bend points to promote contoured wrapping of the main body around the front leg and foot rest brackets on a wheelchair, while also stabilizing the batting material fillers. A pair of straps extend from a side of the main body and include a component of a hook and loop fastener on one side for relaseable attachment with a mating component of a hook and loop fastener on the exterior top side of the case. The main body wraps around the front leg of the wheelchair, over the foot rest brackets, and is secured by the straps.

1 Claim, 4 Drawing Sheets

PROTECTIVE COVER DEVICE FOR ATTACHMENT OVER FOOT REST BRACKETS ON A WHEELCHAIR

This non-provisional patent application is based on provisional patent application Ser. No. 61/011,108 filed on Jan. 16, 2008 and the applicants hereby claim the benefit under Title 35 of the United States Code, Section 119(e).

BACKGROUND OF THE INVENTION

1. Discussion of the Related Art

Most wheelchairs provide for removeable attachment of footrests. The footrests are pivotally and removeably fitted on the front legs of the wheelchair with the use of foot rest brackets. The foot rest brackets are permanently attached to the front legs of the wheelchair above the front wheels. These foot rest brackets cause numerous injuries ranging from bruises and skin tears to severe lacerations that can take weeks to heal. Such injuries occur primarily during wheelchair transfer of ill elderly patients with limited mobility. Injuries happen whether the patient is being assisted or getting into the chair on their own. While foot rest brackets on wheelchairs are inherently dangerous, and continue cause severe injuries, there is no solution available in the prior art for protectively covering these foot rest brackets.

The present invention provides a convenient, highly effective and inexpensive device for protectively covering the foot rest brackets on the wheelchair in order to prevent injuries to persons using a wheelchair. More particularly, the injury protective device of the present invention easily attaches by wrapping the device around the front leg of the wheelchair in covering relation to the foot rest brackets. The device includes a multi-layer, sandwiched construction of polyester batting and densified batting forming a thick cushioned barrier over the foot rest brackets and around the front legs of the wheelchair.

2. Objects and Advantages of the Invention

Considering the foregoing, it is a primary object of the present invention to provide an injury protective cover device for attachment over foot rest brackets on a wheelchair, and wherein the protective cover device is lightweight, easy to install, and highly effective in preventing injuries to a patients' lower extremities when transferring into and out of a wheelchair.

It is a further object of the present invention to provide a protective cover device for attachment over foot rest brackets on a wheelchair, and wherein the protective device is specifically structured to bend and contour easily around the front leg and foot rest brackets on a wheelchair.

It is still a further object of the present invention to provide a protective cover device for attachment over foot rest brackets on the front legs of a wheelchair, and wherein the protective device is structured to provide a thick cushion barrier between foot rest brackets on the front legs of a wheelchair and a patients' lower extremities, thereby preventing injury.

It is yet a further object of the present invention to provide a protective cover device for attachment over foot rest brackets on the front legs of a wheelchair, and wherein the protective cover device includes a soft outer case that will not damage an elderly person's skin upon contact.

It is still a further object of the present invention to provide a protective cover device for attachment over foot rest brackets on the front legs of a wheelchair, and wherein the protective cover device is washable by either hand wash or machine wash and drying.

It is still a further object of the present invention to provide a protective cover device for attachment over foot rest brackets on the front legs of a wheelchair, and wherein the protective cover device is adapted to be manufactured and sold at an affordable price.

These and other objects and advantages of the present invention are more readily apparent with reference to the following detailed description and accompanying drawings.

SUMMARY OF THE INVENTION

The present invention is directed to an injury protection device for attachment over foot rest brackets on the front legs of a wheelchair. The device includes a generally rectangular main body having an outer case constructed of a durable soft fabric material and defining a top side and a bottom side. An interior pocket formed between the top side and bottom side of the outer case is filled with a central core of premium densified batting that is sandwiched between upper and lower layers of polyester batting. An arrangement of tacking stitches made from the top side to the bottom side of the outer case increase flexibility of the main body and provide bend points to promote contoured wrapping of the main body around the front leg and foot rest brackets on a wheelchair. The tacking points also serve to create a tufting effect and increase stability of the core batting material fillers; preventing shifting of the core batting material when hand or machine washing and drying. A pair of straps extend from a side of the main body and include a component of a hook and loop fastener on one side for relaseable attachment with a mating component of a hook and loop fastener on the exterior top side of the case. The main body wraps around the front leg of the wheelchair, over the foot rest brackets and is secured by the straps.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENT

Figure 1:
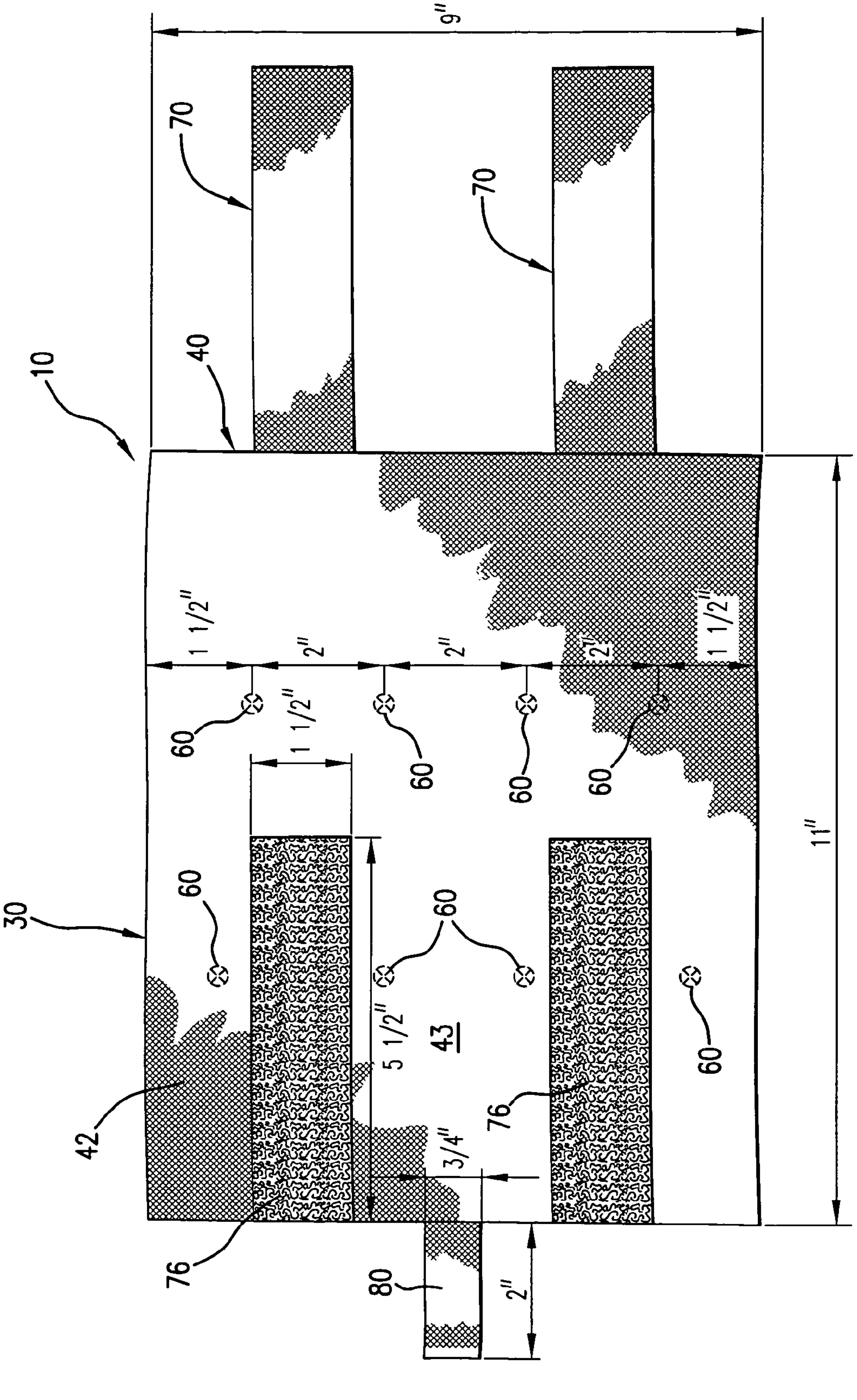
FIG. 1 is a top plan view of the protective cover device of the present invention.

Referring to the several views of the drawings, the protective cover device of the present invention is shown and is generally indicated as 10. The protective cover device 10 is specifically designed for easy attachment on the front legs 22 of a wheelchair 20 in a manner that completely covers the projecting foot rest brackets 24 on the front legs. The protective cover device 10 includes a main body 30 which, in a preferred embodiment, has a rectangular configuration. In one preferred embodiment, the dimensions of the main body are 11 inches wide by 9 inches tall with an approximate thickness of 1.5 to 2 inches.

The main body 30 includes on outer case 40 formed of a soft, durable fabric material and including a top side 42 within an exterior face 43 and a bottom side 44 with an exterior face 45. The top and bottom sides of the outer case 40 are joined (e.g., by stitching) about their peripheries to form an interior pocket 48. The interior pocket is filled with a batting filler 50 of sandwiched construction. More particularly, the inner batting filler 50 includes a core filler 52 formed of a premium densified batting that is sandwiched between upper 54 and lower layers 56 of a 100% polyester batting. In a preferred embodiment, the core densified batting is approximately 1 inch thick, while the upper and lower polyester batting layers are each approximately ¼" thick.

Figure 2:
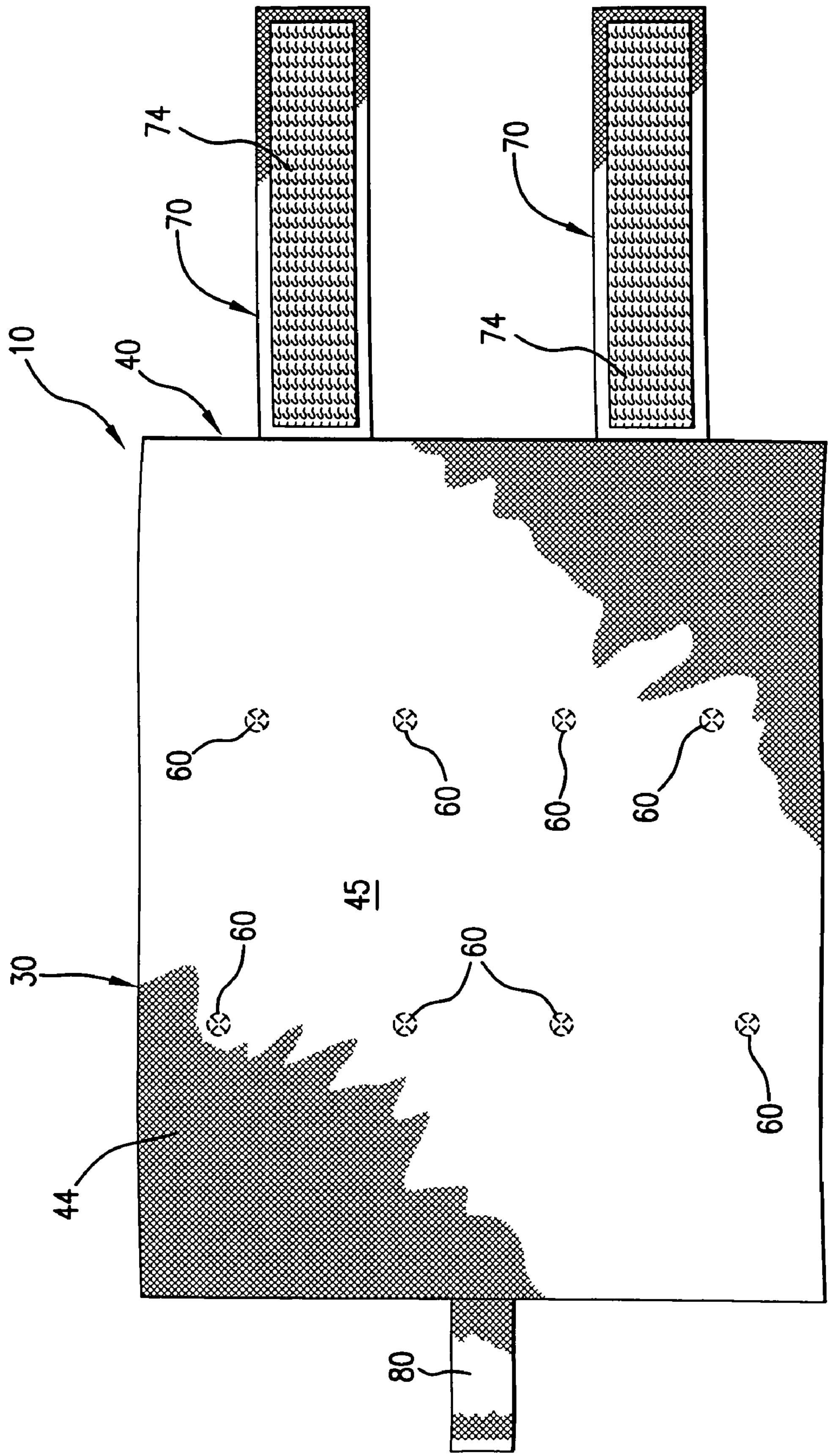
FIG. 2 is a bottom plan view of the protective cover device.
Figure 5:
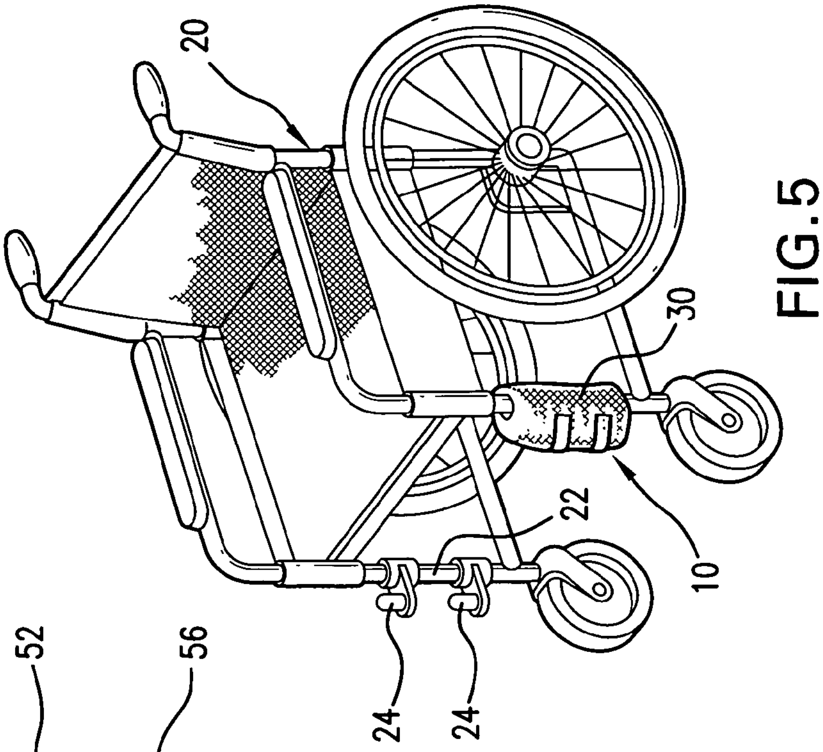
FIG. 5 is a perspective view showing the protective cover device of the present invention wrapped about and secured to the front leg of a wheelchair and protectively covering the foot rest brackets.
Figure 3:
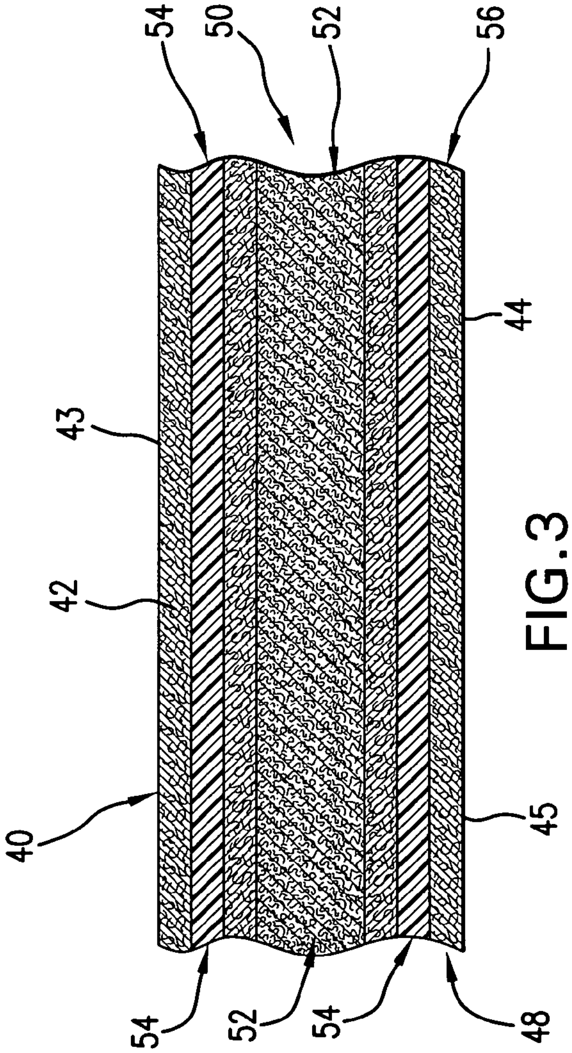
FIG. 3 is an isolated cross-sectional view showing a sandwiched construction of polyester batting and thick premium densified batting providing a core filler material within an outer fabric case of the device.
Figure 4:
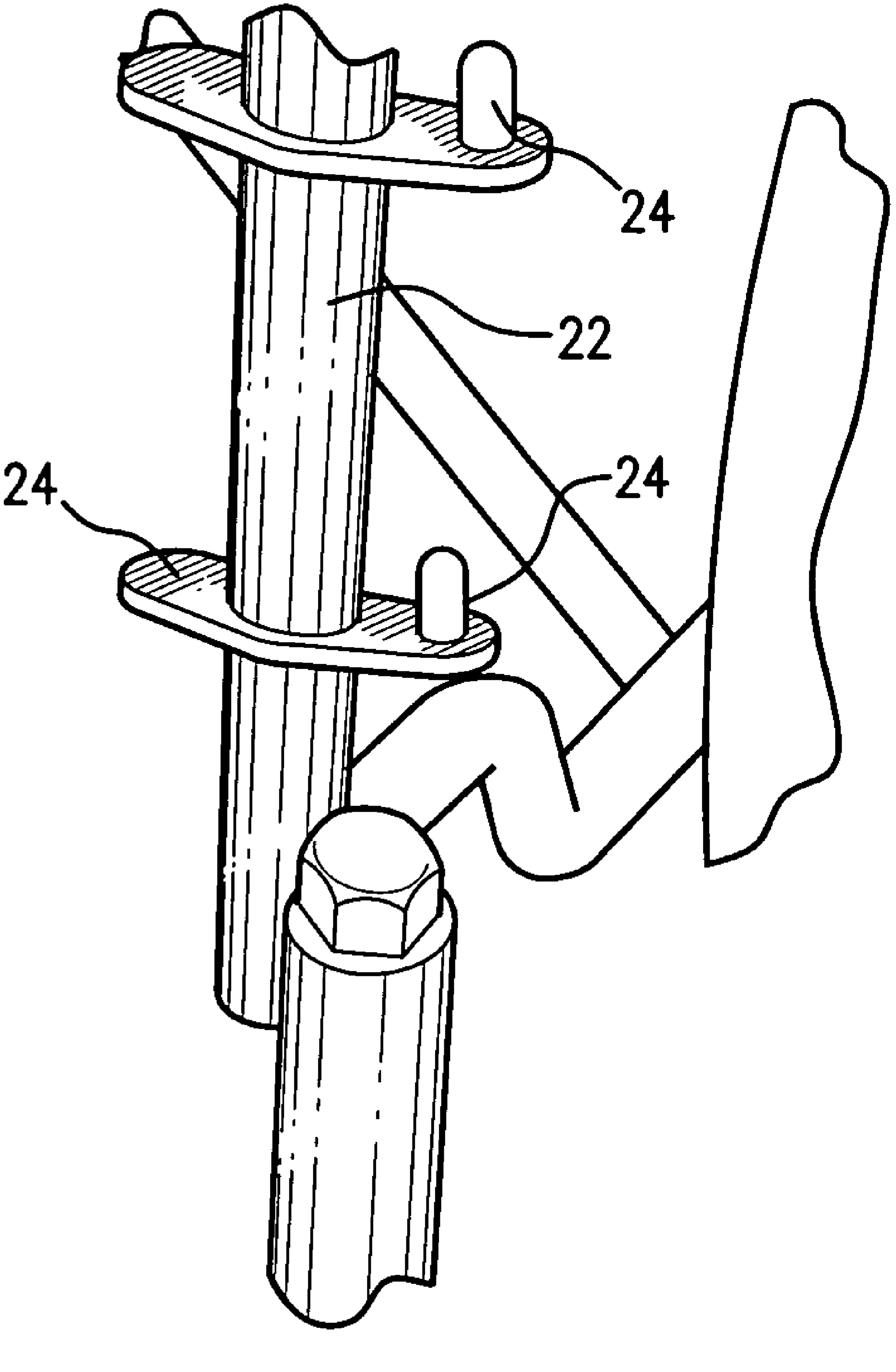
FIG. 4 is an isolated view of a front leg of a wheelchair showing foot rest brackets thereon.

A plurality of tacking stitches 60 are made in a spaced arrangement, as seen in FIGS. 1 and 2. Each tacking stitch 60 extends from the top side 42 of the case 40 to the bottom side 44 of the case, pulling the top and bottom sides of the case closer together, and thereby creating a tufting effect. The spaced arrangement of tacking stitches serve to create bend points to increase flexibility of the main body 30, so that the main body of the device can be easily wrapped around and contoured to the configuration of the wheelchair leg 22 and the protruding foot rest brackets 24. The plurality of tacking stitches also serve to increase the stability of the core batting material fillers. More specifically, the plurality of tacking stitches 60 help to prevent shifting of the interior batting material 50, particularly when hand or machine washing and drying.

The main body 30 of the protective cover device is secured and held in place around the front leg 22 of the wheelchair 20 with the use of straps 70 and hook and loop fasteners. More particularly, the device includes a pair of straps 70 that are each secured at one end to a side edge of the main body 30. The straps 70 extend from the side of the main body and are adapted to be secured to the top exterior surface 43 of the outer case 40 when the main body 30 of the device 10 is wrapped around the front leg 22 of the wheelchair 20. More specifically, the bottom sides 72 of the straps 70 are provided with a hook component 74 of a hook and loop fastener for mating, releaseable attachment with corresponding loop components 76 on the top side exterior face 43 of the case 40. An I.D. label 80 is sewn to an opposite side edge of the case 40 and provides identification and care instructions.

The protective cover device 10 of the present invention is constructed using zig-zag stitching for added strength and increased visual appeal. The thread used is durable cotton quilting thread. The construction process according to the preferred embodiment is as follows:

1. Attach loop part of hook and loop fastener (face up) to 20"×12" outer material by stitching the perimeter and stitching diagonally from corner to corner.
2. Mark locations of tacking points
3. Fold outer material in half, thus dividing the 20" side in half and creating a 10"×12" piece of folded material.
4. Place material with the folded edge down and with the loop material of the hook and loop fastener facing upward and to the left.
5. Begin stitching the left side while adding the I.D. Label between the pieces of fabric. The label should now be folded in half to create a 2"×¾" loop.
6. Stitch the right side while adding two securing straps (with the hook component of the hook and loop fasteners facing down) between the pieces of fabric, thus creating a three sided pocket.
7. Into the pocket, insert the densified batting, sandwiched by the two pieces of 100% polyester batting.
8. Stitch the top edge to complete the enclosure of the filler products.
9. Perform the tacking stitches in the designated locations to create tufting effect and increase the stability of the fillers during cleaning maintenance (i.e., hand or machine wash and drying).

The protective cover device is easily attached by wrapping the main body around the front leg of the wheelchair, and over the foot rest brackets. The plurality of tacking stitch points serve to increase flexibility and thus provide bend points that contour easily around the wheelchair leg and foot rest brackets. To complete the installation, the securing straps are attached to the outer facing top side of the case using the hook and loop fasteners. It is important to face the hook and loop fasteners and the securing straps away from the patient's legs to avoid discomfort and possible injury to the skin.

While the present invention has been shown and described in accordance with a preferred and practical embodiment thereof, it is recognized that departures from the instant disclosure are fully contemplated within the spirit and scope of the present invention.

What is claimed is:

1. A protective cover device in combination with a wheelchair comprising:

front legs on the wheelchair;

foot rest brackets attached to the front legs on the wheelchair for supporting foot rests;

the protective cover device including a pair of protective covers each being structured for attachment around a respective one of the front legs of the wheelchair and over the foot rest brackets of the respective one of the front legs of the wheelchair, each one of the pair of protective covers comprising:

an outer case formed of a soft, durable fabric and including a top side with an outer face and a bottom side with an outer face, and said top and bottom sides of said case surrounding an enclosed interior pocket;

a shock absorbent and cushioning filler contained within said interior pocket and filling an entire interior volume of said pocket, and said filler including:

an upper layer formed of 100% polyester batting;

a lower layer formed of 100% polyester batting; and a core sandwiched between said upper and lower layers, and said core formed of a premium densified batting;

a plurality of tacking stitches disposed in spaced arrangement and attaching between said top side and said bottom side of the case and extending through said filler, and each of said plurality of tacking stitches pulling said top and bottom sides of said case closer together at the location of each of said plurality of tacking stitches to create tufts, and said spaced arrangement of said plurality of said tacking stitches increasing the flexibility of the protective cover and providing a plurality of bend points for allowing the protective cover to wrap and contour around the respective one of the front legs of the wheelchair and the foot rest brackets so that the protective cover device is held snug and secure against the front leg of the wheelchair; and a plurality of securing straps and each of said securing straps including one component of a hook and loop fastener for releasable attachment with a mating component of a hook and loop fastener on the outer face of the top side of the case.

* * * * *